US011075024B2

(12) United States Patent
Stoner

(10) Patent No.: US 11,075,024 B2
(45) Date of Patent: Jul. 27, 2021

(54) ELECTRIC FENCE INSULATOR

(71) Applicant: Gallagher Group Limited, Hamilton (NZ)

(72) Inventor: Daniel Stoner, Hamilton (NZ)

(73) Assignee: Gallagher Group Limited, Hamilton (NZ)

(*) Notice: Subject to any disclaimer, the term of this patent is extended or adjusted under 35 U.S.C. 154(b) by 594 days.

(21) Appl. No.: 15/760,167

(22) PCT Filed: Sep. 14, 2016

(86) PCT No.: PCT/NZ2016/050148
§ 371 (c)(1),
(2) Date: Mar. 14, 2018

(87) PCT Pub. No.: WO2017/048136
PCT Pub. Date: Mar. 23, 2017

(65) Prior Publication Data

US 2018/0254128 A1 Sep. 6, 2018

(30) Foreign Application Priority Data

Sep. 14, 2015 (NZ) ........................................ 712281

(51) Int. Cl.
*H01B 17/14* (2006.01)
*E04H 17/10* (2006.01)
(Continued)

(52) U.S. Cl.
CPC ........... *H01B 17/145* (2013.01); *A01K 3/005* (2013.01); *E04H 17/017* (2021.01); *E04H 17/10* (2013.01)

(58) Field of Classification Search
CPC ...... A01K 3/005; E04H 17/003; E04H 17/04; E04H 17/10; E04H 17/12; H01B 17/145
(Continued)

(56) References Cited

U.S. PATENT DOCUMENTS 1,213,201 A * 1/1917 Hutchinson ............. E04H 17/10 256/48
1,525,229 A 5/1919 Cotton
(Continued)

FOREIGN PATENT DOCUMENTS

CA 2270747 10/2000
CA 2286419 10/2000
(Continued)

OTHER PUBLICATIONS

Valley Farm Supply/Gallagher Electric Fence Superstore; retrieved from website on Apr. 22, 2016; https://gallagherelectricfencing.com/products/gallagher-porcelain-doughnut-insulator, 2 pages.
(Continued)

*Primary Examiner* — Josh Skroupa
(74) *Attorney, Agent, or Firm* — Moore & Van Allen PLLC; Henry B. Ward, III

(57) ABSTRACT

An insulator for an electric fence, an electric fence system using the insulator, and a method of installing same are disclosed herein. The insulator includes a body having a first end and a second end, and a wire attachment portion positioned at the first end of the body. A passage passes through the wire attachment portion, the passage including a first open end, a second open end, and a waist region between the first open end and the second open end. The diameter of the passage at the first open end and the diameter of the second open end are both greater than at the waist region.

17 Claims, 3 Drawing Sheets

(51) Int. Cl.
*A01K 3/00* (2006.01)
*E04H 17/00* (2006.01)

(58) Field of Classification Search
USPC ............................. 256/10, 11, 12, 48, 50, 51
See application file for complete search history.

(56) References Cited

U.S. PATENT DOCUMENTS

| | | | | | |
|---|---|---|---|---|---|
| D26,262 | S | | 9/1920 | Austin | |
| 1,821,222 | A | | 9/1931 | Kyle | |
| 1,992,284 | A | | 2/1935 | Banks | |
| 2,138,571 | A | | 11/1938 | Dehmel | |
| 2,468,985 | A | * | 5/1949 | Krotz | F16L 5/10 403/225 |
| 2,537,719 | A | | 1/1951 | Tuepker | |
| 3,240,870 | A | | 3/1966 | Harmon | |
| 3,272,463 | A | | 9/1966 | Greig | |
| 3,749,819 | A | * | 7/1973 | Wilson | H01B 17/145 174/158 F |
| 3,749,820 | A | * | 7/1973 | Langlie | A01K 3/005 174/163 F |
| 4,028,489 | A | * | 6/1977 | Berg, Jr. | H01B 17/145 174/166 R |
| 4,049,905 | A | * | 9/1977 | Maranell | H01B 17/145 174/163 F |
| 4,077,611 | A | * | 3/1978 | Wilson | A01K 3/005 256/10 |
| 4,160,540 | A | | 7/1979 | Lindsey et al. | |
| 4,263,477 | A | * | 4/1981 | Wilson, Sr. | H01B 17/145 174/158 F |
| D283,612 | S | | 4/1986 | Timmington | |
| 4,599,488 | A | * | 7/1986 | Wilson, Jr. | H01B 17/145 174/158 F |
| 4,771,137 | A | * | 9/1988 | Thompson | H01B 17/145 174/163 F |
| D315,334 | S | | 3/1991 | Fujioka | |
| D375,079 | S | | 10/1996 | Pazdirek | |
| D392,616 | S | | 3/1998 | Gagne | |
| 5,945,636 | A | | 8/1999 | Sakich | |
| 5,981,878 | A | | 11/1999 | Zhao | |
| 6,027,082 | A | | 2/2000 | King | |
| D421,958 | S | | 3/2000 | Pratt | |
| 6,056,245 | A | | 5/2000 | White | |
| D438,779 | S | | 3/2001 | Sauber | |
| 6,290,190 | B1 | * | 9/2001 | Kendall | A01K 3/005 256/10 |
| D452,136 | S | | 12/2001 | Harding | |
| D463,971 | S | | 10/2002 | Lillelund et al. | |
| 6,667,442 | B1 | | 12/2003 | Hilligross | |
| 7,318,567 | B2 | | 1/2008 | Mori | |
| D571,190 | S | | 6/2008 | Spadotto | |
| D731,428 | S | | 6/2015 | Sorensen | |
| D747,281 | S | | 1/2016 | Andresen | |
| 9,679,682 | B2 | | 6/2017 | Wall | |
| 2008/0057215 | A1 | | 3/2008 | McCollough | |

FOREIGN PATENT DOCUMENTS

| | | | | | |
|---|---|---|---|---|---|
| CA | 2778556 | | | 4/2011 | |
| DE | 856472 | C | * | 11/1952 | H01B 17/145 |
| DE | 903831 | C | * | 2/1954 | H01B 17/145 |
| FR | 1220852 | A | * | 5/1960 | H01B 17/145 |
| FR | 1276725 | A | * | 11/1961 | H01B 17/145 |
| FR | 2299707 | A1 | * | 8/1976 | H01B 17/145 |
| GB | 1527113 | | | 10/1978 | |
| WO | WO 2012/126049 | | | 9/2012 | |
| WO | WO 2017/018892 | | | 2/2017 | |

OTHER PUBLICATIONS

Wood Post Staple-on Insulator; retrieved from website on Apr. 22, 2016; https://am.gallagher.com/nz/products/electric-fencing/fencing/permanent-fencing/insulators/G71208; 1 page.
www/nemtek.com; Offset Brackets, retrieved from the website on Apr. 22, 2016; http://perimeterlarm.se/downloads/produkter/elektriskt_sakerhetsstangsel/GPA_Nemtek_Electric_Fence.pdf, p. 25.
Zareba Systems. <URL: http://www.zarebasystems.com/electrobraid-roller-post-insulators-irollb10-ebc>. Dec. 25, 2016, Roller Post Insulators.
Amazon<URL: https://www.amazon.com/ElectroBraid-IWHDCLAWEB-EB-Black-Insulators-20-Pack/dp/BOOBPQEMJI/ref=pd_sbs_86_9?_encoding=UTF8&psc=1&refRID=VK47WMTESYBZHZSWD67G.> Oct. 29, 2014. Fence Post Insulators.
PCT, International Search Report dated Dec. 20, 2016, for PCT/NZ2016/050148, 3 pages.

* cited by examiner

ELECTRIC FENCE INSULATOR

TECHNICAL FIELD

The present invention relates to an insulator for an electric fence.

STATEMENT OF CORRESPONDING APPLICATIONS

This application is based on the provisional specification filed in relation to New Zealand Patent Application Number 712281, the entire contents of which are incorporated herein by reference.

BACKGROUND

Electric fencing is well known for use in applications such as security and is used to deliver an electric shock to objects that come in contact with the fencing, or to trigger an alarm if an intrusion attempt is detected.

Typically, electric fences include a plurality of posts, with one or more fence lines of fencing wire passing along the posts to create a barrier. This wire is secured to end posts using brackets and tensioners to keep the fence lines taut, with insulators positioned on posts between the ends to keep the wires spaced apart from each other. Such insulators are required to prevent short circuiting of the wire through the post.

The fence line may have variable orientation. This could be to accommodate changes in elevation of the terrain, avoid proximity to objects such as trees or structures which could compromise security, or simply follow a desired layout of the fence.

In the course of doing so, the fence may produce external corners (i.e. the fence line passes around the fence post, at least in part) and internal corners (i.e. the fence line forms an oblique angle with the fence post at the vertex) along its length, in addition to changes in elevation.

Existing insulators are not well adapted to accommodating all of these variations and multiple types of insulator are used along the fence line, or the fence is installed in a sub-optimal arrangement (potentially compromising security).

Further, some insulator designs attempt to accommodate for change in orientation along the fence line by using moving parts—for example suspended pulleys at corners. Such insulators create complexities in the manufacture and assembly of the insulators, as well as introducing potential points of failure into the design.

In security electric fencing in particular, the insulators can present a potential point of attack in terms of providing hand or foot holds for a would-be intruder when attempting to scale the fence without coming in contact with the fence wire or posts. It may be advantageous to provide an insulator and fence system which increases the likelihood of contact with shock carrying or alarm triggering elements of the fence—particularly within the vertical space between insulators.

It is an object of the present invention to address one or more of the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word “comprise”, or variations thereof such as “comprises” or “comprising”, will be understood to imply the inclusion of a stated element, integer or step, or group of elements integers or steps, but not the exclusion of any other element, integer or step, or group of elements, integers or steps.

Further aspects and advantages of the present invention will become apparent from the ensuing description which is given by way of example only.

SUMMARY

According to an exemplary embodiment there is provided an insulator for an electric fence having at least one wire. The insulator may include a body having a first end and a second end. The insulator may include a wire attachment portion positioned at the first end of the body. The insulator may include a passage passing through the wire attachment portion. The passage may include a first open end, a second open end, and a waist region between the first open end and the second open end. The diameter of the passage at the first open end and the diameter of the second open end may both be greater than at the waist region.

While reference will be made throughout the specification to the insulator being for use with wire in an electric fence, it should be appreciated that it is also suitable for use with other filamentous barrier members known in the art—such as fibrous rope-like material woven with fine conducting wires (known as ‘poly-wire’).

It is well known in the art of electric fencing—particularly for security purposes—to provide fence support structures (herein referred to as fence posts) sufficiently conductive that an electrical connection between the fence wire and the fence post registers as a connection to ground. This may be recognized as an alarm condition, and an alert of an intrusion attempt issued as a result.

Reference to the body of the insulator should be understood to mean a structural member for separating the wire attachment portion from the fence post. The body may be used to help define the desired distance between the fence post and the wire or line to be held by the insulator.

In an exemplary embodiment the body may include a breakaway portion, configured to result in detachment of at least the wire attachment portion when subjected to a predetermined level of force. For example, the breakaway portion may be a cutaway section as known in the art—for example as described in U.S. Pat. No. 6,290,190—unable to support at least a part of the weight of a potential intruder.

In an exemplary embodiment the insulator may include a post connector portion at the second end of the body, for connecting the insulator to a support structure of the fence such as a fence post.

In an exemplary embodiment the post connector portion may include opposing arms with a space therebetween. In such an embodiment, the connector portion may receive at least a portion of the post in the space between the arms. The arms may include fastener apertures, enabling a fastener to be passed through the apertures in the arms and corresponding apertures in the fence post to secure the insulator relative to the post. It should be appreciated that this is not intended to be limiting, and that in exemplary embodiments the post connector portion may be another suitable means known to a person skilled in the art for securing an electric fence insulator to a support structure.

In an exemplary embodiment at least the wire attachment portion may be made of any electrically insulating material deemed to be suitable by a person skilled in the art. For example, the insulating material may be high density polyethylene (HDPE)—being electrically insulating while having material properties suitable for use in security fencing applications in terms of toughness. It should be appreciated that this is not intended to be limiting, and other exemplary materials may include nylon, polycarbonate, polyester, polypropylene, or acrylonitrile butadiene styrene (ABS).

In an exemplary embodiment, at least the body and the wire attachment portion may be manufactured as a unitary part. It is envisaged that the insulator as a whole may be manufactured as a unitary part. However, it should be appreciated that in exemplary embodiments one or more of the features of the insulator may be manufactured as a separate part and attached to the remaining features by any suitable means known in the art.

In an exemplary embodiment, the cross section of the passage may be substantially circular in shape along its length. It is envisaged that this configuration may assist with enabling entry and exit of a wire to and from the passage in a range of orientations without bearing against edges along its length. It should be appreciated that this is not intended to be limiting, and that the passage may have other cross sectional shapes suitable for its intended purpose. For example, the cross section may be elliptical, or a polygon. Further, the shape of the cross section may vary along the length of the passage.

Reference to the diameter of the passage should be understood to mean the largest distance across the passage taken along an axis substantially orthogonal to a longitudinal axis between the first and second open ends of the passage. It should be appreciated that reference to diameter is not intended to be limited to the width of a circular shape—for example, in exemplary embodiments in which the cross section of the passage is polygonal, the diameter may be the length of the longest polygon diagonal (i.e., straight line segment joining two vertices).

It is envisaged that the configuration of the greater diameter of the passage at the first open end and the second open end than at the waist region may assist in accommodating for entry and exit of the wire to and from the passage in a range of directions, while reducing the likelihood of the wire producing a sharp angle or tight radius of curvature. This may reduce the likelihood of the integrity of the wire being compromised at that point (whether under sudden loading, or due to degradation of the wire over time), and make it easier for the wire to be pulled through the passage during installation.

Additionally, it provides a long creepage path at least along the outer surface of the wire attachment portion, across the body and back to the post to assist in preventing high voltage breakdown between the live fence wire and the earthed post.

In an exemplary embodiment the passage may flare outwardly from the waist region to the first open end and the second open end. Reference to the passage flaring should be understood to mean a gradual widening of the passage from the waist region along its length towards the first open end and the second open end. It is envisaged that this gradual widening may assist in reducing the likelihood of the wire bearing against a single point or edge of the passage.

In an exemplary embodiment the flare may be a curved flare. Reference to a curved flare should be understood to mean a non-linear widening of the passage such that the passage curves outwardly along its length towards the ends—with the change in width of the passage increasing towards each open end from the waist region.

In an exemplary embodiment, the passage may be substantially in the shape of a hyperboloid. Reference to a hyperboloid should be understood to mean a quadric surface, in particular a one-sheet hyperboloid generally described by the formula:

$$\frac{x^2}{a^2} + \frac{y^2}{b^2} - \frac{z^2}{c^2} = 1$$

In an exemplary embodiment, the passage may be a circular hyperboloid, i.e., a hyperboloid in which each cross section of the passage is substantially circular. It is envisaged that this may assist in maintaining a minimum radius of curvature regardless of the incoming or exiting angle of the line. This may assist in reducing the likelihood of damage to the line caused by its bearing against an edge of the insulator. This may also assist in increasing the creepage distance from the wire to the post—the creepage being at a minimum when the wire angle is such that it contacts the passage at the widest part.

Again, it should be appreciated that this is not intended to be limiting, and that the passage may have other cross sectional shapes suitable for its intended purpose, while still approximating a hyperboloid.

In an exemplary embodiment, the diameter of the first open end and the second open end, and the length of the passage between the first open end and the second open end, may be selected to achieve sufficient creepage distance while also permitting a wide angle exit from the passage without kinking of the wire (i.e. without bearing against an edge of the open ends between the passage and outer surface of the wire attachment portion).

It is envisaged that reducing the diameter relative to the passage length it could not sustain as great angle of exit without kinking. Conversely, if the passage was not as long (i.e. the insular as wide) it could not maintain as great a creepage distance, which prevents undesirable electrical breakdown especially when in wet or salty or dusty conditions.

In an exemplary embodiment, the diameter of the first open end and the second open end may be in the order of about 40 mm to 50 mm. In an exemplary embodiment the diameter may be less than about 45 mm.

In an exemplary embodiment the length of the passage between the first open end and the second open end may be in the order of about 40 mm to 50 mm. In an exemplary embodiment the length may be at least about 44 mm. It is envisaged that this may assist in enabling the use of the insulator to produce external corners in the fence while maintaining a suitable air gap between the wire and fence post to which the insulator is secured. Further, this may assist in avoiding the creation of sharp angles in the line entering and existing the passage.

In an exemplary embodiment the diameter of the passage at its waist may be at least that of the wire intended for use with the insulator. In exemplary embodiments clearance may be provided—for example the waist may have a diameter of about 7 mm to accommodate a 2.5 mm diameter wire.

In an exemplary embodiment, the wire attachment portion may include a wall having an interior surface defining the passage, and an exterior surface.

In an exemplary embodiment, at least a portion of the exterior surface of the wall between the passage and the body of the insulator may be shaped to approximate the shape of the interior surface of the wall.

In an exemplary embodiment, the thickness of at least a portion of the exterior surface of the wall between the passage and the body of the insulator may be less than about 3 mm. In an exemplary embodiment the thickness may be less than about 1 mm. It is envisaged that the likelihood of short circuits or high voltage breakdown due to surface water or other contamination may be reduced through increasing creepage distance with the passage configuration herein described. As such, the thickness of the parts may be reduced for the purpose of reducing weight and material costs in addition to other manufacturing benefits such as reducing the likelihood of cavities being formed during manufacture.

The basic function of an insulator in an electric fence system is to prevent short circuiting of the wire through the post. As such, insulators need to have sufficient creepage distance between the points of connection to the wire and fence post to prevent arcing. However, this should be balanced with keeping the overall size of the insulator compact in order to maintain sufficient clearance between adjacent insulators spaced along the post, for example to reduce the likelihood of bridging by water drops in wet conditions.

It is known to include protrusions on the surface of an insulator dedicated to increasing the creepage distance (known in the art of electric fencing as tracking fins, creepage flanges, or flashguards). By shaping the exterior of the wire attachment portion and/or controlling its thickness in the manner described, it is envisaged that the creepage distance between the passage and the body may be increased to avoid the need for such features—which would otherwise increase the volume of material required and complexity of manufacture.

In an exemplary embodiment the passage may have a first longitudinal axis, and the wire attachment portion may include a second passage having a second longitudinal axis transverse to the first longitudinal axis. The passage having the first longitudinal axis may herein be referred to as the “first passage”.

Reference to the second longitudinal axis being transverse to that of the first longitudinal axis should be understood to mean that the axes are oriented to cross each other (without intersecting) at a point along their lengths. While it is envisaged that the second longitudinal axis may be orthogonal to the first longitudinal axis, it should be appreciated that this is not intended to be limiting.

It is envisaged that a wire may be passed through the second passage of the insulator to create a vertical fence element in the space between adjacent insulators on the same fence post. This may increase the likelihood of a would-be intruder receiving a shock or triggering an alarm, or at least restrict their access to components of the fence.

In an exemplary embodiment the second passage may be located at a position distal from the body relative to the passage having the first longitudinal axis (i.e. the “first passage”). In doing so, the vertical fence element may be positioned as far forward as possible relative to the fence post when installed. It is envisaged that this may reduce the amount of the insulator in front of the vertical fence element which could otherwise be accessed by a would-be intruder.

In an exemplary embodiment, the wire attachment portion may include a crossmember extending between the first and second ends of the first passage on the exterior surface of the wall distal from the body. In an exemplary embodiment the second passage may be defined by the space between the exterior surface of the wall and the crossmember.

In an exemplary embodiment the second passage may be defined by a wire retention member positioned on the crossmember at an equidistant position from the first and second ends of the first passage.

It is envisaged that this may assist in maintaining a degree of separation of the second passage from the first passage necessary to achieving electrical isolation and preventing shorting.

According to an exemplary embodiment there is provided an insulator for an electric fence having at least one wire. The insulator may include a body having a first end and a second end. The insulator may include a wire attachment portion at the first end of the body. The wire attachment portion may include a first passage having a first longitudinal axis. The wire attachment portion may include a second passage having a second longitudinal axis transverse to the first longitudinal axis.

According to an exemplary embodiment there is provided an electric fence system. The electric fence system may include at least one fence post. The electric fence system may include at least one insulator substantially as herein described, to be secured to the fence post. The electric fence system may include at least one fence line, to be supported by the wire attachment portion of the insulator.

According to an exemplary embodiment there is provided method of installing an electric fence system. The method may include the step of securing at least one insulator, substantially as herein described, to a fence post. The method may include the step of supporting at least wire one wire at the wire attachment portion of the insulator.

BRIEF DESCRIPTION OF THE DRAWINGS

Further aspects of the present invention will become apparent from the ensuing description which is given by way of example only and with reference to the accompanying drawings in which.

DETAILED DESCRIPTION

Figure 1A:
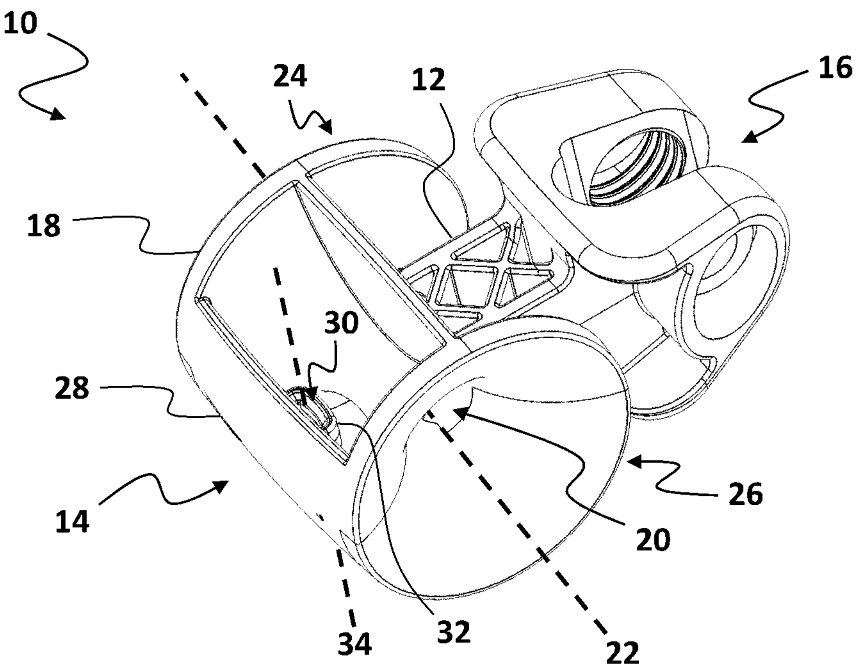
FIG. 1A is a perspective view of an exemplary insulator.

FIG. 1A illustrates an exemplary insulator 10 for an electric fence. The insulator 10 includes a body 12, having a wire attachment portion 14 at a first end and a post connector portion 16 at its second end. In this embodiment the insulator 10 is moulded as a unitary part of an electrically insulating material such as high density polyethylene (HDPE)—although it should be appreciated that other materials may be used.

The wire attachment portion 14 includes a passage wall 18 defining a first passage 20. The first passage 20 has a first longitudinal axis 22 extending between a first open end 24 and a second open end 26 of the first passage 20.

In the exemplary embodiment illustrated, a crossmember 28 spans the space between the first open end 24 and the second open end 26 of the first passage 20 on the side of the passage wall 18 distal from the body 12. A second passage 30 is defined by a wire retention member in the form of an archway 32, located at a position on the crossmember 28 equidistant from the first open end 24 and the second open end 26 of the first passage 20. The second passage 30 has a second longitudinal axis 34, which is substantially orthogonal to the first longitudinal axis 22 in orientation.

Figure 1B:
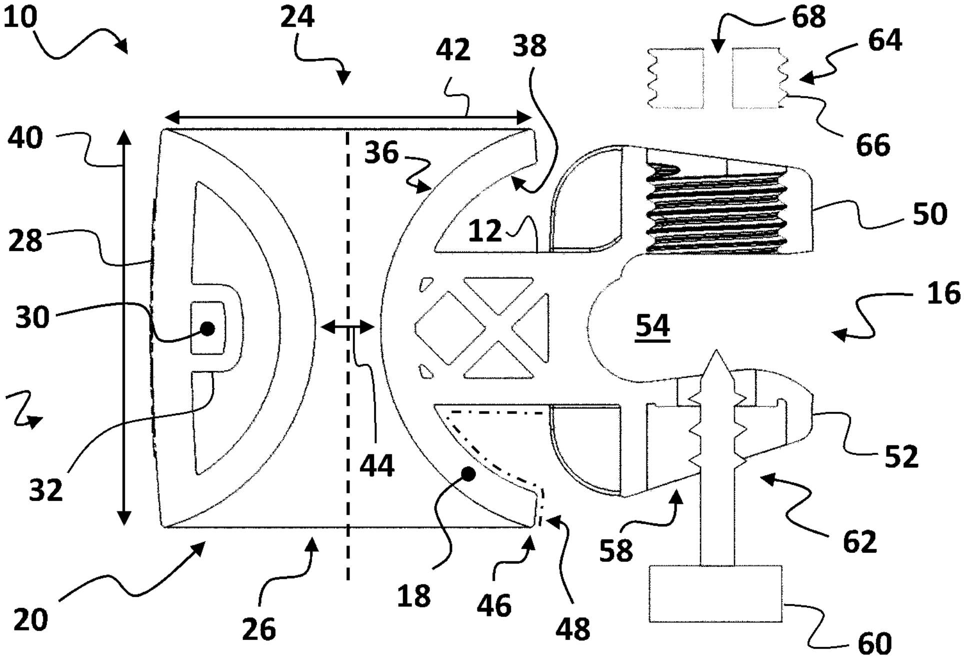
FIG. 1B is a top cross-sectional view of the exemplary insulator.

Referring to FIG. 1B, the passage wall 18 has an interior surface 36 defining the shape of the passage 20, and an exterior surface 38 defining the creepage distance from the first open end 24 and the second open end 26 of the first passage 20 to the body 12.

In this exemplary embodiment, the interior surface 36 defining the passage 20 is substantially in the shape of a circular hyperboloid, in which the passage 20 flares out from a narrow central waist region towards the first open end 24 and the second open end 26.

In this exemplary embodiment, the length 40 of the first passage 20 is about 45 mm. It is envisaged that this may allow for the production of external corners in a fence line (as will be described below with reference to FIG. 3A and FIG. 3B) while maintaining a suitable air gap of about 20 mm between the wire and a post (not illustrated in FIG. 1B) having a width of about 50 mm. It should be appreciated that this is not intended to be limiting, and that the length 40 may be modified depending on the width or configuration of the post it is intended to be used with.

The diameter 42 of the first open end 24 and the second open end 26 is about 44 mm, while the diameter 44 at the waist region is substantially 7 mm. The resulting curvature of the interior surface 36 along the first passage 20 accommodates the entry and exit of a wire at a wide range of angles, while ensuring the wire is not bent beyond a minimum radius of curvature within the first passage 20.

In the exemplary embodiment illustrated, this configuration is intended to achieve an angle of wire being not more than about 45 degrees exiting from either side of the passage—giving a total of about 90 degrees of change in direction. There is an about 62.5 degree angle before a wire will hit the outer edge of the passage—at which point kinking may occur. This means the wire will always be resting on a smooth radius inside the passage—within that about 45 degree operational limit. It should be appreciated that the angles described are exemplary, and is not intended to be limiting to all embodiments unless expressly stated.

The exterior surface 38 of the passage wall 18 is shaped to approximate the shape of the interior surface 36. This results in relatively thin wall structure curved to increase the creepage distance to the body 12, and ultimately the post connection portion 16. For example, if a wire (not illustrated) bears against the passage 20 at point 46, dashed line 48 illustrates the creepage path across the exterior surface 38 of the passage wall 18 and body 12. This is significantly greater than if the exterior surface 38 extended straight across to the body 12.

The post connector portion 16 includes a first arm 50 and a second arm 52, separated by a post receiving space 54. The first arm 50 includes a threaded aperture 56, while the second arm 53 includes a stepped aperture 58. In order to secure the insulator 10 to a post (not illustrated in FIG. 1B), a fastener 60 having a threaded shank 62 is inserted through the stepped aperture 58, and through one or more apertures in the post to reach the threaded aperture 56. A fastener engaging member 64 having external threads 66 is screwed into the threaded aperture 56. The threaded shank 62 is in turn screwed into a bore 68 of the fastener engaging member 64, securing the insulator 10 to the post.

Figure 2A:
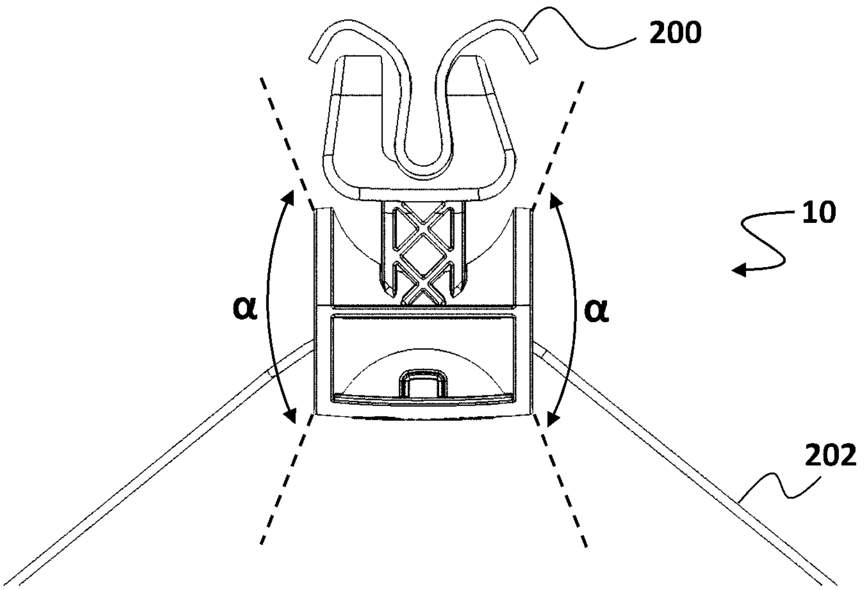
FIG. 2A is a top view of the exemplary insulator positioned on an exemplary fence post.

FIG. 2A illustrates the exemplary insulator 10 positioned on a conductive fence post 200, with a first wire 202 passing through the first passage 20 (not illustrated in FIG. 2A, but as seen in FIG. 1A and FIG. 1B) of the insulator 10.

As the result of the configuration of the passage 20 as described above, the wire 202 can enter and exit the insulator 10 from any angle within the zone designated 'a' without resulting in bending of the wire 202 beyond a radius of curvature set by the passage.

Figure 2B:
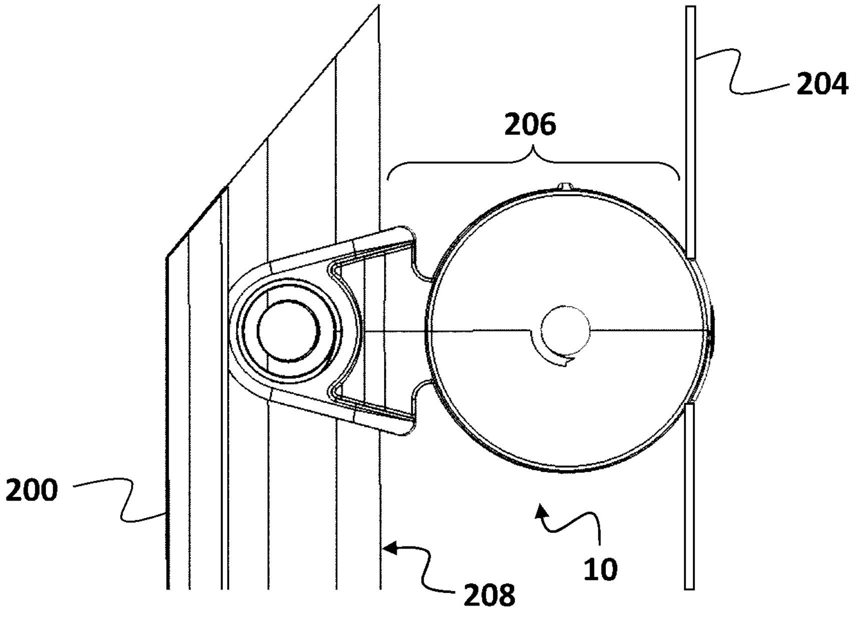
FIG. 2B is a side view of the exemplary insulator.

FIG. 2A illustrates the exemplary insulator 10 positioned on a conductive fence post 200, with a second wire 204 passing through the second passage 30 (not illustrated in FIG. 2B, but as seen in FIG. 1A and FIG. 1B) of the insulator 10 in a vertical orientation.

It may be seen that with the second wire 204 being held at substantially the front of the insulator 10, the second wire 204 restricts access to the space 206 between the wire 204 and the leading edge 208 of the post 200. The upper side of the insulator 10 might otherwise be used as a platform for attempting to scale the fence, or the insulator 10 used as an anchor point for hooking horizontal wires (not illustrated) from above, or below.

Figure 3A:
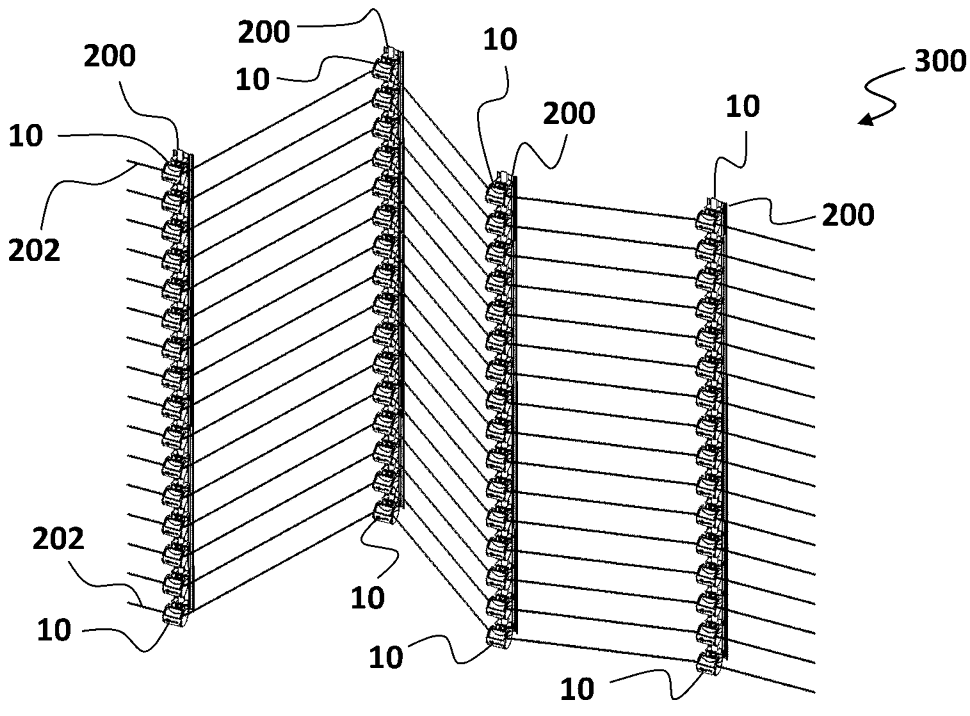
FIG. 3A is a perspective view of a section of an exemplary fence system.

FIG. 3A illustrates an electric fence system 300, including a series of vertical fence posts 200. A plurality of insulators 10 are secured to each fence post 200. Wires 202 are passed through the first passage 20 (not clearly seen in FIG. 3A, but as illustrated in FIG. 1A and FIG. 1B) of each insulator 10 to provide a series of spaced wires 202 which form a barrier.

Figure 3B:
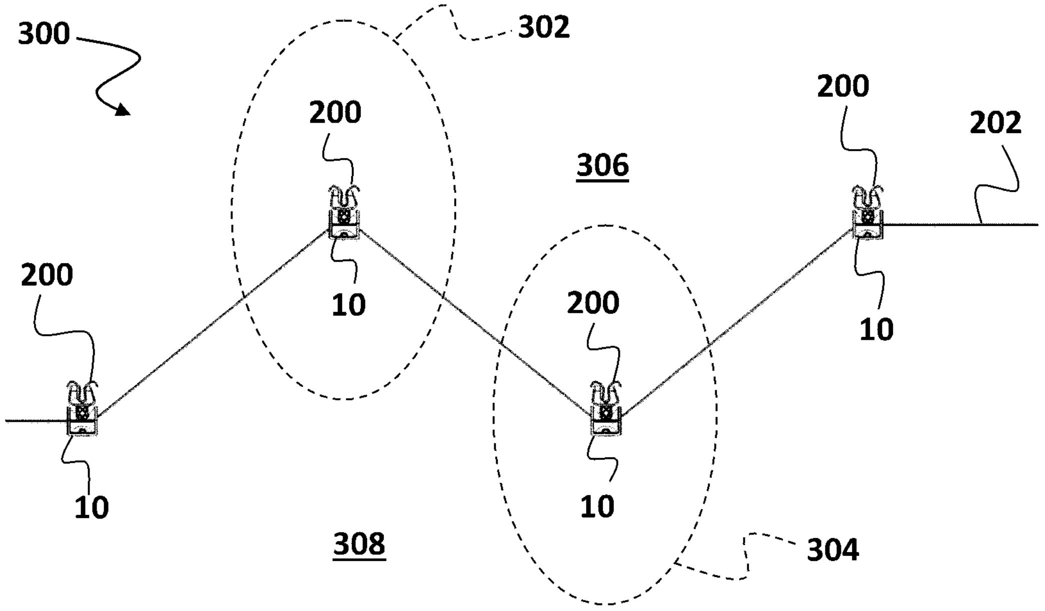
FIG. 3B is a top view of the section of the exemplary fence system.

FIG. 3B illustrates the electric fence system 300 from a birds-eye view, from which it may be seen that the insulators 10 have been able to accommodate both an internal corner (designated by dashed area 302) and an external corner (designated by dashed area 304) while ensuring that all of the fence posts are located on a first side 306 of the fence system 300 with the wire 202 on the other side 308.

The entire disclosures of all applications, patents and publications cited above and below, if any, are herein incorporated by reference.

Reference to any prior art in this specification is not, and should not be taken as, an acknowledgement or any form of suggestion that that prior art forms part of the common general knowledge in the field of endeavour in any country in the world.

The invention may also be said broadly to consist in the parts, elements and features referred to or indicated in the specification of the application, individually or collectively, in any or all combinations of two or more of said parts, elements or features.

Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

Aspects of the present invention have been described by way of example only and it should be appreciated that modifications and additions may be made thereto without departing from the scope thereof as defined in the appended claims.

The invention claimed is:

1. An insulator for an electric fence having at least one wire, the insulator including:

a body having a first end and a second end;

a wire attachment portion positioned at the first end of the body; and a post connector portion at the second end of the body operable for connecting the insulator to a fence post, wherein the wire attachment portion includes a passage passing through the wire attachment portion, the passage including a first open end, a second open end, and a narrow central waist region between the first open end and the second open end, wherein the diameter of the passage at the first open end and the diameter of the second open end are both greater than at the narrow central waist region, and wherein the passage flares outwardly from the narrow central waist region to the first open end and the second open end, in a curved flare, wherein the body, the wire attachment portion and the post connector portion are made of an electrically insulating material, and wherein the insulator is molded as a unitary part, wherein the wire attachment portion includes a wall having an interior surface defining the passage, and an exterior surface, wherein at least a portion of the exterior surface of the wall between the passage and the body of the insulator is shaped to approximate a shape of the interior surface of the wall, and wherein the body is connected to the exterior surface at the narrow central waist region such that an electrical creepage path, from the passage to the fence post to which the insulator is connected, passes along the exterior surface and across the body.

2. The insulator of claim 1, wherein the cross section of the passage is substantially circular in shape along its length.

3. The insulator of claim 1, wherein the passage is substantially in the shape of a hyperboloid.

4. The insulator of claim 1, wherein the diameter of the passage at the first open end and the second open end is about 40 mm to 50 mm.

5. The insulator of claim 1, wherein the length of the passage between the first open end and the second open end is about 40 mm to 50 mm.

6. The insulator of claim 1, wherein the thickness of at least a portion of the exterior surface of the wall between the passage and the body of the insulator is less than about 3 mm.

7. The insulator of claim 6, wherein the thickness of at least a portion of the exterior surface of the wall between the passage and the body of the insulator is less than about 1 mm.

8. The insulator of claim 1, wherein the passage has a first longitudinal axis between the first open end and the second open end, and the wire attachment portion includes a second passage having a second longitudinal axis transverse to the first longitudinal axis.

9. The insulator of claim 8, wherein the second passage is located at a position distal from the body relative to the passage having the first longitudinal axis.

10. The insulator of claim 1, wherein the wire attachment portion includes a cross member on an exterior surface of the wire attachment portion distal from the body, the cross member extending between the first open end and the second open end of the passage.

11. The insulator of claim 1, wherein the wire attachment portion is made of an electrically insulating material.

12. The insulator of claim 1, wherein at least the body and the wire attachment portion are manufactured as a unitary part.

13. The insulator of claim 12, wherein the insulator as a whole is manufactured as a unitary part.

14. An electric fence system, including:

at least one fence post;

at least one insulator to be secured to the fence post, wherein the at least one insulator includes:

a body having a first end and a second end;

a wire attachment portion positioned at the first end of the body; and a post connector portion at the second end of the body operable for connecting the insulator to a fence post, wherein the wire attachment portion includes a passage passing through the wire attachment portion, the passage including a first open end, a second open end, and a narrow central waist region between the first open end and the second open end, wherein the diameter of the passage at the first open end and the diameter of the second open end are both greater than at the narrow central waist region, and wherein the passage flares outwardly from the narrow central waist region to the first open end and the second open end in a curved flare, wherein the body, the wire attachment portion and the post connector portion are made of an electrically insulating material, and wherein the insulator is molded as a unitary part, wherein the wire attachment portion includes a wall having an interior surface defining the passage, and an exterior surface, wherein at least a portion of the exterior surface of the wall between the passage and the body of the insulator is shaped to approximate a shape of the interior surface of the wall, and wherein the body is connected to the exterior surface at the narrow central waist region such that an electrical creepage path, from the passage to the fence post to which the insulator is connected, passes along the exterior surface and across the body; and at least one fence line, provided to pass through the passage of the wire attachment portion of the insulator.

15. The electric fence system of claim 14, wherein:

the passage of the at least one insulator has a first longitudinal axis between the first open end and the second open end, and the wire attachment portion includes a second passage having a second longitudinal axis transverse to the first longitudinal axis, and the electric fence system includes a second fence line provided to pass through the second passage.

16. A method of installing an electric fence system, including the steps of:

securing at least one insulator to a fence post, wherein the at least one insulator includes a body having a first end and a second end, a wire attachment portion positioned at the first end of the body, and a post connector portion at the second end of the body for securing the at least one insulator to the fence post, wherein the wire attachment portion includes a passage passing through the wire attachment portion, the passage including a first open end, a second open end, and a narrow central waist region between the first open end and the second open end, wherein the diameter of the passage at the first open end and the diameter of the second open end are both greater than at the narrow central waist region, and wherein the passage flares outwardly from of the narrow central waist region to the first open end and the second open end in a curved flare, wherein the body, the wire attachment portion and the post connector portion are made of an electrically insulating material, and wherein the insulator is molded as a unitary part, wherein the wire attachment portion includes a wall having an interior surface defining the passage, and an exterior surface, wherein at least a portion of the exterior surface of the wall between the passage and the body of the insulator is shaped to approximate a shape of the interior surface of the wall, and wherein the body is connected to the exterior surface at the narrow central waist region such that an electrical creepage path, from the passage to the fence post to which the insulator is secured, passes along the exterior surface and across the body; and supporting at least one fence line at the wire attachment portion of the insulator by passing the fence line through the passage.

17. The method of claim 16, wherein the passage of the at least one insulator has a first longitudinal axis between the first open end and the second open end, and the wire attachment portion includes a second passage having a second longitudinal axis transverse to the first longitudinal axis, and the method includes passing a second fence line through the second passage to form a vertical fence element of the fence system.

* * * * *